United States Patent Office 3,085,118
Patented Apr. 9, 1963

3,085,118
PREPARATION OF POLYCYCLIC ARYLSODIUM COMPOUNDS
Donald J. Foster, South Charleston, W. Va., assignor to Union Carbide Corporation, a corporation of New York
No Drawing. Filed Oct. 6, 1958, Ser. No. 765,300
11 Claims. (Cl. 260—665)

Polycycylic aryl organometallics, in which the metal atom is substituted for an aromatic hydrogen and directly connected to a carbon atom in an aromatic system, would be valuable intermediates for the preparation of a wide variety of polycyclic derivatives. The extreme reactivity of organometallic compounds, particularly organosodium compounds, is such that if polycyclic organometallic compounds were available they would greatly facilitate the preparation of a large number of compounds which can at present be prepared only by long and involved syntheses.

While there have been many methods studied and developed for making alkyl and aralkyl organosodium compounds, there has been relatively little work done with arylsodium compounds. Most of this has been done with phenylsodium with some work on naphthylsodium. The difficulties in making even naphthylsodium has precluded extensive studies of its properties or fruitful efforts to make higher polycyclic organosodium compounds.

Thus, naphthylsodium has been made by metal-halogen interchange between butylsodium and α-bromonaphthalene (H. Gilman and R. G. Jones, Journal of American Chemical Society, 63, 1441 (1941)). Another method utilizes the rather general reaction of organomercury of organozinc compounds with metallic sodium (W. Schlenk and J. Holtz, Ber., 50, 262 (1917)). A third known method utilizes a metal-hydrogen interchange between naphthalene and amylsodium. All three methods require the making of an organometallic compound as a starting material and none have been shown to be useful for making polycyclic organometallic compounds having more than two rings.

I have now discovered a direct method for the preparation of polycyclic organosodium compounds from metallic sodium and organohalides.

In a preferred embodiment of my invention a polycyclic arylhalide, wherein a halogen is substituted for hydrogen on a ring, is added to a suspension of finely divided sodium dispersed in a suitable liquid. Preferably, the reaction is carried out in an atmosphere which will not promote side reactions and at a temperature below 0° C.

Polycyclic arylsodium compounds which can be made by the process of the invention include naphthylsodium, pyrenylsodium, anthrylsodium, phenanthrylsodium, benzanthrylsodium, benzphenanthrylsodium, dibenzanthrylsodium, naphthoanthrylsodium, dibenzphenanthrylsodium, naphthophenanthrylsodium, fluoranthrylsodium, perylenylsodium and the like.

The polycyclic arylhalides may be a chloride, a bromide or an iodide. The chlorides are preferred because they do not undergo the side reaction of Würtz-type couplings as readily as do the other halides. The liquid in which the sodium is suspended must be a liquid which, at temperatures of about 0° C. or less, does not react with sodium or with the polycyclic arylhalides and which is itself a stable liquid under the reaction conditions. A preferred class of liquids for use in the invention are the aliphatic ethers containing from 2 to 12 carbon atoms. Such ethers include methyl ether, methyl ethyl ether, ethyl ether, n-propyl ether, isopropyl ether, n-butyl ether, isobutyl ether, amyl ethers, hexyl ethers and mixed ethers of the foregoing. Also preferred are ethers of ethylene glycol and of diethylene glycol. These include ethylene glycol dimethyl ether, ethylene glycol diethyl ether, ethylene glycol dibutyl ether, ethylene glycol ethylbutyl ether, diethylene glycol dimethyl ether, diethylene glycol diethyl ether, diethylene glycol dibutyl ether, ethylene glycol ethyl-hexyl ether and diethylene glycol ethyl-hexyl ether.

Also suitable are cyclic ethers such as tetrahydrofuran and dioxane as well as aromatic ethers such as ethylene glycol diphenyl ether and diethylene glycol diphenyl ether.

Yet another class of suitable liquids is the tertiary amines. These include tri-n-butylamine, trimethylamine, triethylamine, N-methylmorpholine, tripropylamine and the like.

Mixtures of any of the above liquids may be employed as the suspending liquid for the sodium suspension and they may be diluted with inert hydrocarbons if desired. It should be noted however that aliphatic hydrocarbon solvents alone are not suitable liquids for use in the invention.

The reaction temperature should be no higher than 10° C. and is preferably maintained below 0° C. At temperatures of 0° C. or below, the tendency to form secondary reaction products which would lower the yield of the desired product is reduced. A preferred temperature is about −10° C. Temperatures below about minus 78° C. are not desirable as they tend to reduce the rate of reaction to such an extent that the formation of the desired product is slowed.

The polycyclic arylhalide may be added to the liquid dispersion of sodium either alone or as a solution of arylhalide in the same liquid or in a compatible liquid. Atmospheric pressure is ordinarily suitable although somewhat higher pressure may be employed if the arylhalide or liquid is low-boiling. It is desirable, moreover, that the reaction be conducted in an atmosphere that will not cause side reactions, as would air. Such an atmosphere may be achieved in any of several ways. One convenient procedure is to conduct the reaction under an inert gas, such as argon or dry nitrogen. Pressure can be atmospheric or may be slightly above if the aryl halide or liquid are low-boiling.

The preferred form for the metallic sodium is sub-division into particles of about 50 micron size or below, although much larger particles are operable in the invention. The smaller particle size increases the rate of reaction, however, probably because the aryl halide reacts on the surface of the metallic sodium and the small particle size presents greater surface area. The necessity for extremely fine sub-division of the sodium decreases when vigorous agitation of the reaction mixture is provided. This is because such agitation aids in the removal of arylsodium and sodium chloride from the surface of the metal and thereby exposes fresh metallic surfaces. The aryl halide is preferably added in less than the stoichiometric amount or slightly less than the stoichiometric amount necessary to react with all the sodium present, so as to assure reaction of all the aryl halide. From 0.40 to 0.50 mols of aryl halide per gram atom of sodium is ordinarily employed. The rate of addition of aryl halide can be varied from immediate mixing of the entire amount to a very slow addition. Rapid addition requires the removal of the considerable heat of reaction, but is generally preferred because with slower addition the probability of undesirable side reactions is greatly increased, decreasing the yield of arylsodium.

A preferred method of operation is to first add a small quantity of aryl halide to a suspension of finely divided sodium in an aliphatic ether, in an inert atmosphere such as dry nitrogen and at room temperature. An exothermic reaction ensues almost immediately and the reaction mixture begins to darken noticeably. The reaction mixture is then cooled, preferably to about 0° C., and the remainder of the aryl halide is added portion-wise, either directly or dissolved in more of the aliphatic ether. Preferably, agitation of the reaction mixture is continued after addition of the aryl halide is complete, in order to insure completion of the reaction.

Because of its high reactivity, the arylsodium product is preferably stored in an inert liquid, which may be the liquid in which it was made, and under an inert atmosphere such as dry nitrogen.

*Example I*

There was prepared a suspension of 28 grams (1.2 gram atoms) of finely divided sodium dispersed in 700 milliliters of ethyl ether. A total of 82 grams (0.5 mol) of alpha-chloronaphthalene was dissolved in 100 milliliters of ethyl ether. The sodium suspension was placed in an inert atmosphere of dry nitrogen at atmospheric pressure and was cooled to a temperature of 0° C. The alpha-chloronaphthalene solution was added with stirring to the sodium suspension over a period of one hour, with the temperature maintained at 0° C. The reaction commenced immediately with the formation of a black, substantially insoluble compound identified as alpha-naphthylsodium. After the addition was complete the mixture was stirred for an additional thirty minutes to insure completion of the reaction.

The ethyl ether slurry of alpha-naphthylsodium thus obtained was poured over solid carbon dioxide to yield sodium alpha-naphthoate. About 250 milliliters of water were then added to react with the excess sodium and to dissolve the sodium salts. The aqueous solution of sodium alpha-naphthoate was then acidified with hydrochloric acid to liberate alpha-naphthoic acid. This alpha-naphthoic acid was extracted with ethyl ether and purified by recrystallization from ethanol. There were obtained 77 grams of alpha-naphthoic acid for a yield of 90 percent. The physical and spectroscopic properties of the alpha-naphthoic acid thus obtained were compared with those of a known sample of alpha-naphthoic acid and found to be identical.

*Example II*

There was prepared a suspension of 28 grams (1.2 gram atoms) of finely divided sodium dispersed in 700 milliliters of ethyl ether. A total of 104 grams (0.5 mol) of alpha-bromonaphthalene were dissolved in 100 milliliters of ethyl ether. The sodium suspension was placed in an inert atmosphere of dry nitrogen at atmospheric pressure and were cooled to a temperature of 0° C. The alpha-bromonaphthalene solution was added with stirring to the sodium suspension over a period of one hour, with the temperature maintained at 0° C. The reaction commenced immediately with the formation of a black, substantially insoluble compound identified as alpha-naphthylsodium. After the addition was complete the mixture was stirred for an additional thirty minutes to insure completion of the reaction.

The ethyl ether slurry of alpha-naphthylsodium thus obtained was poured over solid carbon dioxide to yield sodium-alpha-naphthoate. About 250 milliliters of water were then added to react with the excess sodium and to dissolve the sodium salts. The aqueous solution of sodium alpha-naphthoate was then acidified with hydrochloric acid to liberate alpha-naphthoic acid. This alpha-naphthoic acid was extracted with ethyl ether and purified by recrystallization from ethanol. There were obtained 56 grams of alpha-naphthoic acid for a yield of 65 percent. The physical and spectroscopic properties of the alpha-naphthoic acid thus obtained were compared with those of a known sample of alpha-naphthoic acid and found to be identical.

There were also obtained 16 grams of binaphthyls, primarily the alpha, alpha prime isomer. This represented a 25 percent yield of binaphthyls, based on alpha-bromonaphthalene.

*Example III*

There was prepared a suspension of 28 grams (1.2 gram atoms) of finely divided sodium dispersed in 700 milliliters of ethyl ether. A total of 118 grams (0.5 mol) of 3-chloropyrene were dissolved in 200 milliliters of a mixture of ethyl ether and benzene. The sodium suspension was placed in an inert atmosphere of dry nitrogen at atmospheric pressure and was cooled to a temperature of 0° C. The 3-chloropyrene solution was added with stirring to the sodium suspension over a period of one hour, with the temperature maintained at 0° C. The reaction commenced immediately with the formation of a black, substantially insoluble compound identified as 3-pyrenylsodium. After the addition was complete the mixture was stirred for an additional thirty minutes to insure completion of the reaction.

The ethyl ether slurry of 3-pyrenylsodium thus obtained was poured over solid carbon dioxide to yield sodium pyrene-3-carboxylate. About 250 milliliters of water were then added to react with the excess sodium and to dissolve the sodium salts. The aqueous solution of sodium pyrene-3-carboxylate was then acidified with hydrochloric acid to liberate pyrene-3-carboxylic acid. This pyrene-3-carboxylic acid was extracted with ethyl ether and purified by recrystallization from ethanol. There were obtained 98 grams of pyrene-3-carboxylic acid for a yield of 80 percent. The physical and spectroscopic properties of the pyrene-3-carboxylic acid thus obtained were compared with those of a known sample of pyrene-3-carboxylic acid and found to be identical.

*Example IV*

There was prepared a suspension of 28 grams (1.2 gram atoms) of finely divided sodium dispersed in 700 milliliters of ethyl ether. A total of 106 grams (0.5 mol) of 9-chloroanthracene were dissolved in 200 milliliters of ethyl ether. The sodium suspension was placed in an inert atmosphere of dry nitrogen at atmospheric pressure and was cooled to a temperature of 0° C. The 9-chloroanthracene solution was added with stirring to the sodium suspension over a period of one hour, with the temperature maintained at 0° C. The reaction commenced immediately with the formation of a black, substantially insoluble compound identified as 9-anthrylsodium. After the addition was complete the mixture was stirred for an additional thirty minutes to insure completion of the reaction.

The ethyl ether slurry of 9-anthrylsodium thus obtained was poured over solid carbon dioxide to yield sodium 9-anthroate. About 250 milliliters of water were then added to react with the excess sodium and to dissolve the sodium salts. The aqueous solution of sodium 9-anthroate was then acidified with hydrochloric acid to liberate 9-anthroic acid. This 9 anthroic acid was extracted with ethyl ether and purified by recrystallization from ethanol. There were obtained 61 grams of 9-anthroic acid for a yield of 55 percent. The physical and spectroscopic properties of the 9-anthroic acid thus obtained were compared with those of a known sample of 9-anthroic acid and found to be identical.

*Example V*

There was prepared a suspension of 28 grams (1.2 gram atoms) of finely divided sodium dispersed in 700 milliliters of ethyl ether. A total of 106 grams (0.5 mols) of 9-chlorophenanthrene was dissolved in 100 milliliters of ethyl ether. The sodium suspension was placed in an inert atmosphere of dry nitrogen at atmospheric pressure and was cooled to a temperature of 0° C. The 9-chlorophenanthrene solution was added with stirring to the sodium suspension over a period of one hour, with the temperature maintained at 0° C. The reaction commenced immediately with the formation of a black, substantially insoluble compound identified as 9-phenanthrylsodium. After the addition was complete the mixture was stirred for an additional thirty minutes to insure completion of the reaction.

The ethyl ether slurry of 9-phenanthylsodium thus obtained was poured over solid carbon dioxide to yield sodium phenanthrene-9-carboxylate. About 250 milliliters of water were then added to react with the excess sodium and to dissolve the sodium salts. The aqueous solution of sodium phenanthrene-9-carboxylate was then acidified with hydrochloric acid to liberate phenanthrene-9-carboxylic acid. This phenanthrene-9-carboxylic acid was extracted with ethyl ether and purified by recrystallization from ethanol. There were obtained 39 grams of phenanthrene-9-carboxylic acid for a yield of 35 percent. The physical and spectroscopic properties of the alpha-phenanthrene-9-carboxylic acid thus obtained were compared with those of a known sample of phenanthrene-9-carboxylic acid and found to be identical.

There were also obtained 35 grams of 9,9'-biphenanthryl, representing a 40 percent yield based on 9-chlorophenanthrene.

What is claimed is:

1. Process for making a polycyclic arylsodium compound of more than two rings wherein the sodium is directly attached to a carbon atom in an aromatic ring which comprises reacting a polycyclic aryl halide with finely divided metallic sodium suspended in an inert liquid, selected from the group consisting of aliphatic ethers containing from 2 to 12 carbon atoms, cyclic ethers, aromatic ethers, tertiary amines, and mixtures thereof said reaction being carried out at a temperature below 0° C. and under an inert atmosphere.

2. Process for making a polycyclic arylsodium compound of more than two rings of more than two rings wherein the sodium is directly attached to a carbon atom in an aromatic ring which comprises reacting a polycyclic aryl halide with finely divided metallic sodium suspended in an inert liquid, selected from the group consisting of aliphatic ethers containing from 2 to 12 carbon atoms, cyclic ethers, aromatic ethers, tertiary amines, and mixtures thereof said reaction being carried out at a temperature below 10° C. and under an inert atmosphere.

3. Process for making a polycyclic arylsodium compound of more than two rings wherein the sodium is directly attached to a carbon atom in an aromatic ring which comprises reacting a polycyclic aryl halide with finely divided metallic sodium suspended in an ether containing between two and twelve carbon atoms, said reaction being carried out at a temperature below 0° C. and under an inert atmosphere.

4. Process for making a polycyclic arylsodium compound of more than two rings wherein the sodium is directly attached to a carbon atom in an aromatic ring which comprises reacting a polycyclic aryl chloride with finely divided metallic sodium dispersed in an inert liquid selected from the group consisting of aliphatic ethers containing from 2 to 12 carbon atoms, cyclic ethers, aromatic ethers, tertiary amines, and mixtures thereof, said reaction being carried out under an inert atmosphere and at a temperature below 0° C.

5. Process for making 3-pyrenylsodium which comprises reacting 3-chloropyrene with finely divided metallic sodium dispersed in an inert liquid, selected from the group consisting of aliphatic ethers containing from 2 to 12 carbon atoms, cyclic ethers, aromatic ethers, tertiary amines, and mixtures thereof said reaction being carried out under an inert atmosphere and at a temperature below 0° C.

6. Process for making 9-anthrylsodium which comprises reacting 9-chloroanthracene with finely divided metallic sodium dispersed in an inert liquid, selected from the group consisting of aliphatic ethers containing from 2 to 12 carbon atoms, cyclic ethers, aromatic ethers, tertiary amines, and mixtures thereof said reaction being carried out under an inert atmosphere and at a temperature below 0° C.

7. Process for making 9-phenanthrylsodium which comprises reacting 9-chlorophenanthrene with finely divided metallic sodium dispersed in an inert liquid, selected from the group consisting of aliphatic ethers containing from 2 to 12 carbon atoms, cyclic ethers, aromatic ethers, tertiary amines, and mixtures thereof said reaction being carried out under an inert atmosphere and at a temperature below 0° C.

8. Process for making benzanthryl sodium which comprises reacting chlorobenzanthrene with finely divided metallic sodium dispersed in an inert lique, selected from the group consisting of aliphatic ethers containing from 2 to 12 carbon atoms, cyclic ethers, aromatic ethers, tertiary amines, and mixtures thereof said reaction being carried out under an inert atmosphere and at a temperature below 0° C.

9. Process for making dibenzanthryl sodium which comprises reacting chlorodibenzanthrene with finely divided metallic sodium dispersed in an inert liquid, selected from the group consisting of aliphatic ethers containing from 2 to 12 carbon atoms, cyclic ethers, aromatic ethers, tertiary amines, and mixtures thereof said reaction being carried out under an inert atmosphere and at a temperature below 0° C.

10. Process for making fluoranthryl sodium which comprises reacting chlorofluoranthrene with finely divided metallic sodium dispersed in an inert liquid, selected from the group consisting of aliphatic ethers containing from 2 to 12 carbon atoms, cyclic ethers, aromatic ethers, tertiary amines, and mixtures thereof said reaction being carried out under an inert atmosphere and at a temperature below 0° C.

11. Process for making a polycyclic arylsodium compound of more than two rings wherein the sodium is directly attached to a carbon atoms in an aromatic ring which comprises reacting a polycyclic aryl halide with finely-divided metallic sodium suspended in an ether selected from the group consisting of ethyl ether, propyl ethers, butyl ethers, hexyl ethers, diethylene glycol ether and ethylene glycol dibutyl ether, said reaction being carried out under an inert atmosphere and at a temperature below 0° C.

References Cited in the file of this patent

UNITED STATES PATENTS

| | | |
|---|---|---|
| 2,019,832 | Scott | Nov. 5, 1935 |
| 2,023,793 | Scott | Dec. 10, 1935 |
| 2,027,000 | Scott | Jan. 7, 1936 |
| 2,108,277 | Walker | Feb. 15, 1938 |
| 2,119,493 | Scott | May 31, 1938 |
| 2,125,401 | Scott | Aug. 2, 1938 |
| 2,174,293 | Scott | Sept. 26, 1939 |
| 2,795,624 | Nobis et al. | June 11, 1957 |
| 2,795,626 | Nobis et al. | June 11, 1957 |
| 2,914,578 | Nobis et al. | Nov. 25, 1959 |

OTHER REFERENCES

Coates: "Organo-Metallic Compounds" (1956), pp. 16 and 17, John Wiley & Sons, N.Y.

Jeanes et al.: "J. Am. Chem. Soc. 59," 2609–2615.